Dec. 26, 1967 E. BUCHER 3,360,244
PROTECTIVE DEVICE ON ROADS
Filed Feb. 26, 1964
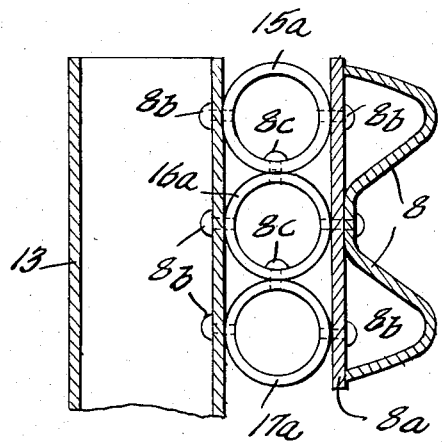
INVENTOR
Edwin Bucher,
BY
Watson, Cole, Grindle & Watson
ATTORNEYS

United States Patent Office 3,360,244
Patented Dec. 26, 1967

3,360,244
PROTECTIVE DEVICE ON ROADS
Edwin Bucher, Muhlegasse 22, Zurich, Switzerland
Filed Feb. 26, 1964, Ser. No. 347,489
Claims priority, application Switzerland, Feb. 28, 1963,
2,600/63
1 Claim. (Cl. 256—13.1)

The known protective devices against vehicles running off the roadway generally consist of the actual protective wall (steel rail, concrete rail, wire ropes, netting, railing) rigidly or resiliently supported by posts and their anchoring.

The main disadvantages of the construction known heretofore are: elastic throw-back of the vehicles, relatively sudden braking with consequent injury to human life and material, indentations on the protective wall intended as guard rail, together with the necessity of carrying out big repair work on the protective devices and anchorings after being strained by blows. The latter holds good especially for the anchoring of the protective device on bridge bodies.

According to the present invention these main disadvantages are essentially obviated in that, in the line of force between the point of impact of a vehicle on the protective wall and its anchoring, there is arranged at least one yielding damping member returning to position with delayed action or not.

According to the invention, the yielding damping member returning to position with delayed action or not, is of such design as to yield already when slightly strained, and the coefficient of resistance increases with the yielding.

Moreover, the damping member according to the invention is effective as damper at least up to that magnitude of the mechanical straining, at which other constructional parts of the protective device start to yield or are destroyed.

The damping member may be designed as a Newton's damper or as a combination of spring and damper of the Maxwell or Voigt-Kelvin types. Deformation then takes place for instance by pressing-out an air cushion, displacing a hydraulic cylinder, permanent deforming of materials, deforming of loose aggregates or displacing of neighboring parts on a friction surface. Thereby it is essential that the kind of deformation is characterized by a short time of relaxation or retardation.

According to the invention, the damping member may be designed as a destructible element consisting of a hollow body which, upon impact, is partly or entirely destroyed and subsequently changed for another. This gives the advantage that the damping member responds rapidly according to Hook's law, with immediate dissipation of the energy stored up in elastically deformed parts, so that an elastic throw-back does not occur even with slight impacts. Through its design as a cheap, easily exchangeable wearing part, particularly effective and at the same time economical constructive solutions are obtained.

At especially dangerous points, where relatively frequent impacts with the protective device must be reckoned with, the damping member is of such design as to be repeatedly effective. Analogously to the action with the destructible element according to the invention, it then consists of a spring-like element and an element dissipating the energy stored up in the spring. Upon impact the spring is deformed. The return to position is retarded, and after the impact the spring slowly resumes its original shape.

When using destructible elements, for easy exchangeability, it is preferable to have them arranged at a readily accessible place between the protective wall and its supporting members. Here the damping member serves at the same time as distance keeper and prevents the posts or other anchoring parts being run against. Alternatively, it may be arranged between the supporting members and their anchoring in the roadway itself.

The anchoring of the protective wall may also be effected through other supporting bodies, or these may, as for instance on concrete bridges, form part of a supporting structure. The arrangement of the damping member designed according to the invention is then particularly effective because of the rigid anchoring in the concrete body.

Increased effectiveness is achieved when several damping members are arranged in the line of force between protective wall and anchoring.

The protective wall may consists of any desired material (concrete, steel, light-metal, plastics, ropes, netting). Depending on the use, distinction must be made between guiding and catching devices. In constructions used predominantly as guiding devices (guard rails), the protective wall is designed rigid according to the invention. The shape remains unchanged during the whole impact action and, with minimum friction between rail and vehicle, the rail guides effectively. On the one hand, the assignment of the guiding on a wall of stable shape, and on the other hand the absorbing of the energy of impact by the damping member designed according to the invention, constitutes a main feature of the present invention.

The rigid protective wall (guard rail) may consist of concrete, steel, light-metal or some other material with a hard surface causing slight friction. Moreover, the guard rail according to the invention is designed light in weight. Because of the light weight, there is small mass-inertia of the protective wall and hence rapid response of the damping member.

According to the invention, the guard rail may be combined with a wheel run-on member known per se. The first stabilizing of a vehicle swerving from the roadway then occurs through the run-on member, and the guard rail comes only gradually into action.

In constructions used predominantly as catching devices (ropes, netting) the protective wall is designed yielding. The damping member may be a constructional part of the protective wall.

When using ropes and netting, it is preferable to have them attached to the posts through damping members according to the invention and/or to provide the wire ropes themselves with tensile-stressed damping members. This may be effected, say, by an overlapping arrangement of two ropes, or by having the tension lock designed as damping member.

Further features of the invention will appear from the following description and claims, taken in conjunction with the accompanying drawing, wherein there are shown, purely by way of example, different forms of embodiment incorporating the invention.

In said annexed drawing the single figure is a sectional view of a protective wall or guard rail.

The drawing shows a preferred form of a guard rail structure in which a rail 8 is secured on a base plate 8a and is connected to the post 13 through the rings 15a, 16a, 17a in superposed relation, designed as wearing parts, which become pressed flat upon impact, as well as by the screwed joints 8b. On slight shocks, rail 8 behaves elastically. The rings 15a, 16a, 17a are, on the other hand, plastically deformed, thus provide a great damping effect and may be easily changed for new ones.

Instead of the rings 15a, 16a, 17a, parts of other shapes may be provided. The wearing part may also be of such design that the force necessary for its destruction increases with increasing deformation.

What I claim is:

A protective device for roadways comprising a vertically arranged post adapted to be secured along the edge of the roadway, a rail extending parallel with the highway and secured on a base plate, and a plurality of rings one above the other and secured as to adjacent rings and also to the post and the plate, said rings being permanently deformable to produce a damping effect when the rail is struck by a vehicle.

References Cited

UNITED STATES PATENTS

| | | | |
|---|---|---|---|
| 2,089,929 | 8/1937 | Brickman et al. | 256—13.1 |
| 2,193,689 | 3/1940 | Gleason et al. | 256—13.1 X |
| 1,612,163 | 12/1926 | Todd | 256—13.1 X |
| 1,718,875 | 6/1929 | Ramsey | 256—13.1 |
| 1,927,189 | 9/1933 | Sory | 256—13.1 X |
| 2,047,992 | 7/1936 | Berk | 256—13.1 |
| 2,160,519 | 5/1939 | Robertson | 256—13.1 |
| 2,167,635 | 8/1939 | Camp | 256—13.1 |
| 2,349,648 | 5/1944 | Brickman | 256—13.1 |
| 2,898,090 | 8/1959 | Ramussen | 256—13.1 |
| 2,988,332 | 6/1961 | Binetti et al. | 256—13.1 |
| 2,047,990 | 7/1936 | Carswell | 256—13.1 |

FOREIGN PATENTS

| | | |
|---|---|---|
| 1,304,119 | 8/1961 | France. |
| 607,636 | 8/1960 | Italy. |

DAVID J. WILLIAMOWSKY, *Primary Examiner.*

DENNIS L. TAYLOR, HARRISON R. MOSEIEY,
*Examiners.*